(12) United States Patent
Festeau et al.

(10) Patent No.: US 7,244,519 B2
(45) Date of Patent: Jul. 17, 2007

(54) PVD COATED RUTHENIUM FEATURED CUTTING TOOLS

(75) Inventors: Gilles Festeau, Ferney Voltaire (FR); X. Daniel Fang, Franklin, TN (US); David J. Wills, Brentwood, TN (US)

(73) Assignee: TDy Industries, Inc., Pittsburgh, PA (US)

( * ) Notice: Subject to any disclaimer, the term of this patent is extended or adjusted under 35 U.S.C. 154(b) by 203 days.

(21) Appl. No.: 10/922,750

(22) Filed: Aug. 20, 2004

(65) Prior Publication Data

US 2006/0051618 A1   Mar. 9, 2006

(51) Int. Cl.
    *B32B 9/06* (2006.01)
(52) U.S. Cl. ............................ 428/698; 51/207; 51/309; 75/241; 428/469; 428/472; 428/699; 204/197.11
(58) Field of Classification Search ................ 51/307, 51/309; 75/241; 428/469, 472, 698, 699; 204/192.11
See application file for complete search history.

(56) References Cited

U.S. PATENT DOCUMENTS 4,574,011 A * 3/1986 Bonjour et al. ............... 75/241

FOREIGN PATENT DOCUMENTS

| GB | 622041 | * | 4/1949 |
| GB | 1082568 | * | 9/1967 |
| GB | 1309634 | * | 3/1973 |
| JP | 2003-306739 | * | 10/2003 |
| JP | 2004-181604 | * | 7/2004 |
| WO | 99/13121 | * | 3/1999 |
| WO | 00/52217 | * | 9/2000 |

OTHER PUBLICATIONS

Tracey et al "Development of Tungsten Carbide-Cobalt-Ruthenium Cutting Tools for Machining Steels" Proceedings Annual Microprogrammin Workshop vol. 14, 1981, p. 281-292.*

* cited by examiner

*Primary Examiner*—Archene Turner
(74) *Attorney, Agent, or Firm*—Kirkpatrick + Lockhart Presto Gates Ellis LLP; Mark R. Leslie; Patrick J. Viccaro

(57) ABSTRACT

The present invention relates to the PVD coated tungsten carbide (WC) based cemented cutting inserts with ruthenium (Ru) as a key chemical element, or a key feature, in the cobalt (Co)-based binder phase, particularly useful for machining today's mold & die materials. In the Ru—Co mixed binder phase in the tungsten carbide substrate, the ratio of Ru/Co is at least 3%, by weight. The Ru-featured carbide cutting insert provided in this invention is PVD coated with one or more layers by a modern PVD coating technology. The development of the PVD coated Ru-featured carbide cutting inserts provided in this invention is based on a discovery that the unique combination of PVD coating techniques and Ru-featured carbide cutting inserts demonstrates superior machining performance in today's mold & die machining applications.

17 Claims, 2 Drawing Sheets

PVD COATED RUTHENIUM FEATURED CUTTING TOOLS

TECHNICAL FIELD

The present invention relates to cemented carbide based cutting tools and inserts coated by a physical vapor deposition process. More specifically, the present invention relates to such cutting tools and inserts comprising ruthenium (Ru) as a component in the binder of the cemented carbide and methods of producing such cutting tools.

BACKGROUND

Cemented carbide cutting tools and inserts (generally "cutting tools") are commonly employed in machining operations such as, for example, cutting, drilling, reaming, countersinking, counterboring, end milling, turning, grooving, threading, and tapping. The manufacturing process for cemented carbide cutting tools involves consolidating metallurgical powder (comprised of hard particles and a binder) to form a compact. The compact is then sintered to form a cylindrical tool blank having a solid monolithic construction. Subsequent to sintering, the tool blank may be appropriately machined to form a cutting edge or other features of the particular geometry desired on the cutting tool.

Cemented carbide tools are industrially important because of the combination of tensile strength, wear resistance, and toughness that is characteristic of these materials. The hard particles may be, for example, carbides, nitrides, borides, silicides, or oxides of elements within groups IVB through VIB of the periodic table. A common example is tungsten carbide. The binder may be a metal or metal alloy, typically cobalt, nickel, iron or alloys of these metals. The binder "cements" the hard particles within a continuous matrix interconnected in three dimensions.

The physical and chemical properties of cemented carbide materials depend in part on the individual components of the metallurgical powders used to produce the material. The properties of the cemented carbide materials are determined by, for example, the chemical composition of the hard particle, the average particle size and particle size distribution of the hard particles, the chemical composition of the binder, and the ratio of binder to hard particle in the substrate. By varying the components of the metallurgical powder, cutting tools, including cutting inserts, may be produced with unique properties matched to specific applications. Many cemented carbide cutting tools are prepared with in cobalt as the primary component of the binder, such cemented carbides may be particularly useful for machining today's mold and die materials. The weight percentage of cobalt as a binder in such cemented carbide cutting tools, typically, ranges from 5 to 20%.

Presently, a very limited amount of cemented carbide cutting tools have been prepared with ruthenium added to a cobalt binder. According to the reference book Modern Metal Cutting by Sandvik (ISBN-9197229930, 1996), typical substrates of cutting inserts are tungsten-based carbide (WC), cubic boron nitride (CBN), ceramic (AI2O3/Si3N4), titanium-based carbide or cermet (TiC/TiN), coronite (combined high speed steel and carbide) and polycrystalline diamond (PCD). According to the reference book World Directory and Handbook of Hardmetals and Hard Materials, 5$^{th}$ Edition (ISBN-0950899526), 1992, by K. J. Brookes, which collects carbide data from all major carbide cutting tool manufacturers worldwide, almost all tungsten carbides use cobalt as a binder with addition of a balance of some other alloying compounds, such as TiC, TaC/NbC, to refine the properties of the substrate for particular applications.

Ruthenium (Ru) is a member of the platinum group and is a hard, lustrous, white metal that has a melting point of approximately 2,500° C. Ru does not tarnish at room temperatures, and may be used as an effective hardener, creating alloys that are extremely wear resistant. Stellram, an Allegheny Technologies Company located at 1 Teledyne Place, LaVergne, Tenn., USA 37086, has found that adding an amount of Ru into the cobalt binder continuous phase of a tungsten carbide substrate results in a cemented carbide cutting insert with improved resistance to thermal cracking and significant reduction of the propagation of cracks along and beyond the cutting insert edges and propagation of cracks into the substrate during use in machining processes. Such substrates may be called Ru-featured cemented carbides. The amount of Ru may be varied depending on the application, however, typical commercially available products include a concentration of ruthenium in the binder phase of cemented carbide substrates in the ranges of approximately 5% to 25%, by weight.

The cemented carbide substrates may additionally include a single or multiple layer coating to enhance cutting performance of tungsten carbide cutting inserts. Methods for coating cemented carbide cutting tools include chemical vapor deposition (CVD), physical vapor deposition (PVD) and diamond coating. Most often, CVD is used to apply the coating to cutting inserts due to the well-known advantages of CVD coatings in cutting tools. It is well known that PVD coatings are thinner than CVD coatings, thus provide the advantage of retaining sharp cutting edges.

As an example of PVD coating technologies, U.S. Pat. No. 6,352,627 B2 discloses a PVD coating method and device, which is based on magnetron sputtering techniques to produce refractory thin films or coats on cutting inserts, can deliver three consecutive voltage supplies during the coating operation, promoting an optimally enhanced ionization process that results in good coating adhesion on the substrate, even if the substrate surface provided is rough, for example because of grinding or jet abrasion treatment. Examples of some other PVD coating technologies are ion plating, arc discharge evaporation, ion beam assisted deposition and activated reactive evaporation.

Diamond compacts, or composite diamond compacts, may contain Ru as a significant element in the substrate material (no more than 20% by volume), such as in U.S. Pat. No. 6,620,375 B1, European Patent 1,077,783. Diamond compacts may also be called polycrystalline diamond (PCD) and may be manufactured under elevated temperature and pressure conditions. Diamond compacts are brittle in nature and thus they have to be bonded to a substrate that contains a binder, such as cobalt, iron or nickel, that may further include Ru. A diamond compact contains a polycrystalline mass of diamond particles presented in an amount of at least 80% by volume of the substrate. Diamond compacts are typically used in abrading or abrasive tools for sawing, milling or profile cutting of wood products.

Ru-featured cemented carbide cutting inserts are limited to either uncoated or CVD coated, that is to say, no PVD coatings have not been applied to Ru-featured carbide cutting inserts. For example, X500™, a commercial designation of Stellram's cutting tool products, is a multiple layer TiN—TiC—TiN CVD coated carbide cutting insert having Ru-featured substrate for the applications in machining of titanium alloys, nickel based alloys and ductile iron; and X44™ and X22™ (both commercial designations of Stellram's cutting tool products) are uncoated Ru-featured cemented carbide cutting inserts for applications in machining of steels and alloyed steels.

Different from conventional cobalt-based binder phase, in a Ru-featured cemented carbide substrate, cobalt (Co) and ruthenium (Ru) act as a mixed solvent during the sintering process. It is known that a cemented carbide cutting inserts with cobalt as a binder have a tendency for cobalt to penetrate through the surface of the compact and melt during the sintering process forming cobalt structures on the surface. This process is often referred to as cobalt capping. Cobalt caps on the substrate surface are randomly distributed, thus creating a crested and rough texture on the surface of the coating tool. The presence of Ru in the cobalt binder exaggerates the cobalt capping on cemented carbides, increasing the height and frequency of the cobalt caps. Even though some surface treatment techniques may be performed to reduce the cobalt capping effect to some degree, it is difficult to consistently produce a uniform surface on a sintered cemented carbide cutting inserts containing Ru in the binder. However, commercially available coated tools have compensated for the enhanced cobalt capping effects on the surface of the carbide cutting inserts including Ru-featured binders by applying a thick CVD coating with or without some pre-surface treatment methods like electropolishing, micro-blasting, wet blasting, compressed air blasting, etc. Thick CVD coating layers may cover up and reduce the overall impact of the cobalt capping. Additionally, the elevated CVD coating temperature (usually above 1500° C.) slightly melts the surface region of the cemented carbide and promotes better adhesion of the CVD coating layer to the surface. Thus, as of today, the Ru-featured carbide cutting inserts are limited only to uncoated and CVD coated inserts.

A PVD coating process involves a much lower coating temperature and, therefore, does not remelt the surface binder and tends to produce coatings that are not as well adhered to the carbide substrate surface. Additionally, thin PVD coatings cannot compensate for the enhanced cobalt capping effect. This is believed to be the reason that Ru-featured carbide cutting inserts are limited to uncoated or CVD coated cutting tools. The apparent difficulties of applying the low operation temperature based thin PVD coatings to guarantee consistent surface quality of coated carbide cutting inserts has not been considered feasible.

SUMMARY

The present invention relates to coated cutting tools comprising a substrate, wherein the substrate comprises hard particles and a binder, and the binder comprises ruthenium. The cutting tools may have at least one coating on at least a portion of the substrate, wherein the coating has the characteristics of a coating applied by physical vapor deposition. The binder may comprise at least one of iron, nickel, cobalt and alloys of such elements. The ruthenium concentration in the binder may be any concentration capable of providing the substrate with the desired properties. In certain embodiments, the concentration of ruthenium in the binder may be from 3% to 30%, by weight.

The cutting tool of the present invention comprises at least one coating having the characteristics of a coating applied by PVD of a metal carbide, a metal nitride, a metal boride and a metal oxide of a metal selected from groups IIIA, IVB, VB, and VIB of the periodic table, such as but not limited to, at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN).

The present invention also relates to methods of coating a substrate, comprising applying a coating on a substrate by physical vapor deposition, wherein the substrate comprises hard particles and a binder and the binder comprises ruthenium. The method may also include treating the substrate prior to coating the substrate, such as by electropolishing, microblasting, wet blasting, grinding, brushing, jet abrading and compressed air blasting. Additional coatings on the substrate may be applied by either by physical vapor deposition or chemical vapor deposition.

The reader will appreciate the foregoing details, as well as others, upon considering the following detailed description of certain non-limiting embodiments. The reader also may comprehend additional details of the present disclosure upon making and/or using the PVD coated cutting tools of the present disclosure.

BRIEF DESCRIPTION OF THE FIGURES

FIGS. 1A, 1B and 1C show an embodiment of a typical cutting insert, wherein FIG. 1A is a perspective view of the cutting insert, FIG. 1B is a top view of the cutting insert, and FIG. 1C is a side view of the cutting insert.

DESCRIPTION OF EMBODIMENTS OF THE INVENTION

Figure 1A:
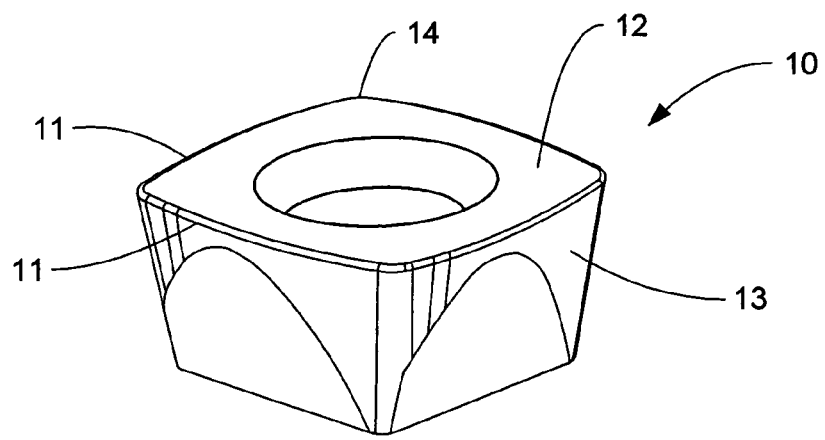

The present invention in directed to a cutting tool comprising a substrate, wherein the substrate comprises hard particles and a binder, and the binder comprises ruthenium. The substrate additionally comprises at least one coating on at least a portion of the substrate, wherein the coating has the characteristics of a coating applied by physical vapor deposition.

Embodiments include cutting tools in which the substrate may be any combination of hard particles and a binder, such as a cemented carbide. The binders of cemented carbides are typically at least one of iron, nickel, cobalt, and alloys of these metals. In embodiments of the present invention the binder additionally includes ruthenium. Ruthenium may be present in any quantity effective to have a beneficial effect on the properties of the cutting tool, such as a concentration of ruthenium in the binder from 3% and 30%, by weight. In certain embodiments, the concentration of ruthenium in the binder may be from 8% and 30%, by weight, from 8% and 20%, or even from 10% and 15%, by weight.

The binder also may contain, for example, elements such as W, Cr, Ti, Ta, V, Mo, Nb, Zr, Hf, and C up to the solubility limits of these elements in the binder. Additionally, the binder may contain up to 5 weight percent of elements such as Cu, Mn, Ag and Al. One skilled in the art will recognize that any or all of the constituents of the cemented carbide material may be introduced in elemental form, as compounds, and/or as master alloys.

The hard particles of substrates of the present invention may be at least one of metal carbides, nitrides, borides, suicides, oxides, and solid solutions thereof. More specifically, the hard particles may comprise at least one transition metal carbide, nitride, boride, silicide and oxide selected from such compounds titanium, chromium, vanadium, zirconium, hafnium, tantalum, molybdenum, niobium, and tungsten or solid solutions thereof. As used herein, a cemented carbide includes substrates containing such hard particles in a binder. In a preferred cutting tool embodiment, the substrate comprises tungsten carbide in a binder of cobalt and ruthenium.

The coating applied by physical vapor deposition may be any coating capable of being applied by any physical deposition method. Typical, PVD processes include, but are not limited to, evaporation processes, activated reactive evaporation, arc discharge evaporation, laser ablation, ion plating, and sputtering, ion plating, and ion beam assisted deposition. The PVD coatings generated on Ru-featured cemented carbide cutting inserts can be characterized as thin, hard, homogeneously smooth, chemically stable and having a highly dense structure. PVD coatings may be further characterized by some unique differences in the microstructure and residual stresses of coatings deposited by PVD and CVD. PVD coating will have high residual compression stress and fine grains usually improve the hardness and toughness of PVD coatings. Embodiments of the coating applied by PVD may be at least one coating comprising at least one of a metal carbide, a metal nitride, a metal boride, and a metal oxide of a metal selected from groups IIIA, IVB, VB, and VIB of the periodic table. For example, coating on the cutting tools of the present invention may be at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN). In certain embodiments, the coating may be from 1 to 10 micrometers thick. Though it may be preferable in specific applications for the PVD applied coating to be from 2 to 6 micrometers thick.

The present invention also includes a method of coating a substrate. Embodiments of the method of the present invention include applying a coating on a cemented carbide substrate by PVD, wherein the cemented carbide substrate comprises hard particles and a binder and the binder comprises ruthenium. The PVD coated Ru-featured carbide cutting inserts provided in this invention may use any PVD coating technology. Such PVD coating applied to the substance comprising a binder including ruthenium produce coatings with enhanced hardness, reduced friction, chemical stability, wear resistance, thermal crack resistance and prolonged tool life. In embodiments, the coating may be applied to a thickness of from 1 to 10 micrometers (microns) or in certain embodiments a thickness of 2 to 6 micrometers may be desirable.

The method may include treating the substrate prior to coating the substrate. The treating prior to coating comprises at least one of electropolishing, shot peening, microblasting, wet blasting, grinding, brushing, jet abrading and compressed air blasting. Pre-coating surface treatments on any coated (CVD or PVD) carbide cutting inserts may reduce the cobalt capping effect of substrates. Examples of pre-coating surface treatments include wet blasting (U.S. Pat. Nos. 5,635,247 and 5,863,640), grinding (U.S. Pat. No. 6,217,992 B1), eletropolishing (U.S. Pat. No. 5,665,431), brushing (U.S. Pat. No. 5,863,640), etc. Improper pre-coating surface treatment may lead to poor adhesion of PVD coats on the Ru-featured carbide substrate, thus resulting in premature failure of PVD coatings. This is primarily due to the fact that the PVD coating layers are thin and the surface irregularities due to cobalt capping are more pronounced in a Ru-featured carbide substrate.

In certain embodiments, the method may comprise applying a second coating comprising of at least one of a metal carbide, a metal nitride, a metal boride and a metal oxide of a metal selected from groups IIIA, IVB, VB, and VIB of the periodic table. Embodiments may comprise applying at least one coating selected from titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN). The method may include applying the second and any additional coatings on the substrate by physical vapor deposition or chemical vapor deposition.

Surprisingly, a thin PVD coated Ru-featured carbide cutting tool demonstrated superior machining performance and exhibits satisfactory and consistent quality when compared to uncoated and CVD coated Ru-featured cutting tools. A PVD coating method typically may comprise all or some of the following units and steps:

a cleaning station for cleaning and drying process steps;
a pre-coating surface treating of the substrates, such as, but not limited to electropolishing, shot peening, microblasting, wet blasting, grinding, brushing, jet abrading and compressed air blasting, dust extraction and vacuum cleaning;
a quality management computer system for effective in-process quality control and documentation;
a batching station for handling the sequence and method for automatic loading parts; and
an optional post-coating surface treating, such as, but not limited to, blasting, shot peening, compressed air blasting, and brushing, to further improve the surface finish of the coated parts.

Certain embodiments of the cutting tools of the present invention may incorporate a step of treating the coating on the substrate to further improve the surface quality on the coated cutting inserts. Treating of the PVD coating of the cutting inserts of the present invention can further improve the surface quality of the coated layer. There are a number of methods for post treatment of a coated cutting insert surface, for example, shot peening, Japanese Patent 02254144, that describes a process using injection of small metal particles having a spherical grain shape with grain size in a range of 10-2000 mm. Another example of post-coating surface treatment is compressed-air blasting, European Patent 1,198,609 B1, that describes a process using an inorganic blasting agent, like $Al_2O_3$, with a very fine grain size ranging from 1 to 100 mm. Another example of post coating treatment is brushing, U.S. Pat. No. 6,638,609 B2, that describes a process using a nylon straw brush containing SiC grains. A gentle wet blasting may also be used as a post-coating surface treatment to create a smooth coating layer such as described in, U.S. Pat. No. 6,638,609 B2. In general, a fine surface treatment technique on PVD coated inserts can create smoothed and homogenized surface structure of PVD coatings on carbide cutting inserts.

The following examples of PVD coated cemented carbide tools and comparative machining test examples were conducted at different cutting conditions in order to evaluate advantages of cutting tools and methods according to the present disclosure.

EXAMPLES

Example 1

Uncoated Sample Tungsten Carbide Insert with 13 wt % Ruthenium in the Binder (X22 Substrate)

According to ISO standard on the substrate grade of cutting tool materials, X22 is close to a tough grade K30. Shown in Table 1 were the chemical compositions of the X22 metal powers. The major compositions in such powder materials include WC, Co and Ru. Some mechanical properties for the sintered tungsten carbides are also listed in Table 1.

TABLE 1

| Chemical Composition of the Substrate (wt. %) | | | Average Grain Size | Transverse Rupture Strength | Density | Hardness |
|---|---|---|---|---|---|---|
| WC | Co | Ru | ($\mu m$) | ($N/\mu m^2$) | ($g/cm^3$) | (HRA) |
| 90.8 | 8.0 | 1.20 | <1 | 3500 | 14.55 | 92.0 |

The metal powders in the weight percentages shown in Table 1 were mixed and then wet blended by a ball mill over a 72-hour period. After drying, the blended compositions were compressed into green sized bodies of the designed cutting insert under a pressure of 1-2 tons/cm². Then the compacted green bodies of the tungsten carbide cutting inserts were sintered, or heat-treated, in a furnace to close the pores in the green bodies and build up the bond between the hard particles to increase the strength and hardness. In particular, to effectively reduce the micro-porosity of the sintered substrate and ensure the consistent sintering quality of the X22™ Ru-featured carbide cutting inserts, the sinter-HIP, i.e. high-pressure sintering process, was used to introduce a pressure phase following the dewaxing, presintering and low-pressure nitrogen ($N_2$) sintering cycle. The sintering procedure X22™ Ru-featured carbide cutting inserts was performed using the following parameters during the major processing steps:

the dewaxing cycle started at room temperature with a ramping speed of 2° C./min until reaching a temperature of 400° C. and then held at this temperature for approximately 90 minutes;

the presintering cycle, which breaks down the oxides of Co, WC, Ti, Ta, Nb, etc., started with a ramping speed of 4° C./min until reaching a temperature of 1,200° C. and then held this temperature for an additional 60 minutes;

the low pressure nitrogen ($N_2$) gas was introduced at 1,350° C. during the temperature ramping from 1,200° C. to 1,400° C./1,450° C., i.e. sintering temperature, and then held at this sintering temperature 1,400° C./1,450° C. at a pressure of about 2 torrs for approximate 30 minutes;

the sinter-HIP process was then initiated while at the sintering temperature, i.e. 1,400° C./1450° C., during the process that argon (Ar) pressure was introduced and rose to 760 psi in 30 minutes, and then the pressure of the sinter-HIP process was held at this pressure for additional 30 minutes; and finally the cooling cycle was carried out to let the heated green bodies of the X22™ carbide cutting inserts cool down to room temperature while inside the furnace.

The X22™ Ru-featured carbide cutting inserts produced by this process shrunk into the desired sintered size and became non-porous.

Example 2

PVD Coated Sample Tungsten Carbide Insert with 13 wt % Ruthenium in the Binder (X44 Substrate)

Metal powder materials in the weight percentages shown in Table 2 were prepared. The major compositions in such powder materials include WC, TiC, TaC, NbC, Co and Ru. Some mechanical properties for the sintered tungsten carbides are also listed in Table 2.

TABLE 2

| Chemical Compositions (weight %) | | | | | | Average Grain Size | Transverse Rupture Strength | Density | Hardness |
|---|---|---|---|---|---|---|---|---|---|
| WC | TiC | TaC | NbC | Co | Ru | ($\mu m$) | ($N/\mu m^2$) | ($g/cm^3$) | (HRA) |
| 67.2 | 10 | 7 | 2 | 12 | 1.80 | 1-2 | 2300 | 11.70 | 91.4 |

The metal powders with compositions as defined in Table 2 were mixed and then wet blended in a ball mill over a 72-hour period. After drying, the blended compositions were compressed into green sized bodies of the designed cutting insert under a pressure of 1-2 tons/cm². Then the compacted green bodies of the tungsten carbide cutting inserts were sintered, or heat-treated, in a furnace to close the pores in the green bodies and build up the bond between the hard particles to increase the strength and hardness. In particular, to effectively reduce the micro-porosity of the sintered substrate and ensure the consistent sintering quality of X44™ Ru-featured carbide cutting inserts, the sinter-HIP, i.e. high-pressure sintering process, was used to introduce a pressure phase following the dewaxing, presintering and vacuum sintering cycle. The sintering procedure for X44™ Ru-featured carbide cutting inserts was performed using the following parameters during the major processing steps:

the dewaxing cycle started at room temperature with a ramping speed of 2° C./min until reaching a temperature of 400° C. and then this temperature was held for an additional 90 minutes;

the presintering cycle, which breaks down the oxides of Co, WC, Ti, Ta, Nb, etc., started with a ramping speed of 4° C./min until the temperature reached 1,200° C. and then this temperature was held for approximately 60 minutes;

the vacuum cycle was then begun at a temperature of 1,350° C. during the temperature ramping process of the presintering cycle from 1,200° C. to 1,400° C./1,450° C., and then held at this sintering temperature for about 30 minutes;

the sinter-HIP process was then initiated while at the sintering temperature, i.e. approximately 1,400° C./1,450° C., during the process argon (Ar) gas was introduced and raising the pressure to 760 psi in 30 minutes, and then the sinter-HIP process held at this pressure for additional 30 minutes; and the cooling cycle was conducted to let the heated green bodies of the X44™ carbide cutting inserts cool down to room temperature while inside the furnace.

Thus obtained X44™ Ru-featured carbide cutting inserts shrunk into the desired sintered size and became non-porous. Followed by the sintering process, the sintered tungsten carbide cutting inserts may be ground and edge-honed to become finished uncoated final products. Followed by the sintering process, the sintered tungsten carbide cutting inserts may be ground and edge-honed to be ready for pre-coating surface treatment and PVD coating operation.

The PVD coating process for this X44™ substrate is a single layer with coating material composition of aluminum-titanium-nitride or AlTiN. Prior to PVD coating, the surface of X44 carbide cutting inserts was blasted to provide better prepared surface. The PVD coating is around 4 microns in thickness on the surface of Ru-featured X44 carbide cutting inserts.

Example 3

Figure 1B:
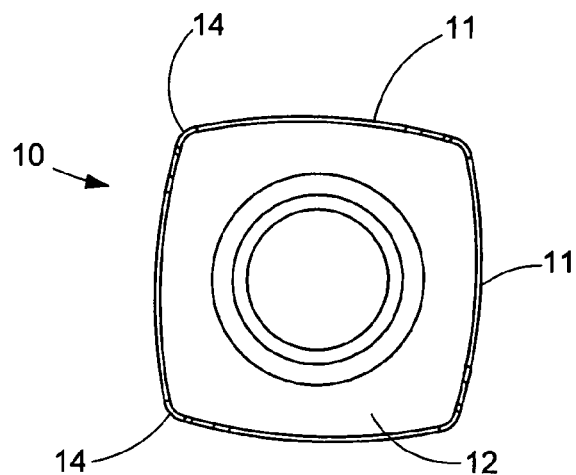
Figure 1C:
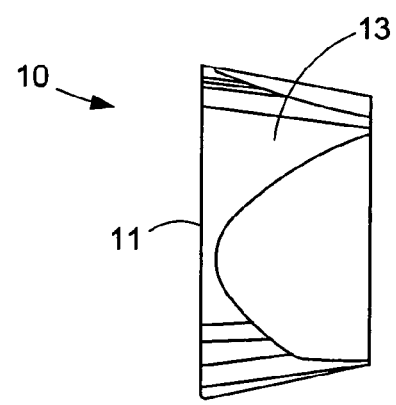

Comparative Testing Results of High-Feed Milling Inserts:

A series of milling cutting inserts with the same insert shape and top geometry, described according to the ASTM Standard as XDLW120508SR-D, was selected as testing inserts to compare machining performance of different types of cutting inserts including the one with Ru-featured substrate provided in this invention. Based on ISO standard, the insert XDLW120508SR-D can be described as a special shape, as shown in FIGS. 1A, 1B and 1C, with 12 mm in diameter, 5.56 mm in thickness and single sided with a clearance angle of 15 degrees. Embodiments of the cutting inserts 10 have cutting edges 11, a top surface 12, side walls 13 and nose corners 14. Such cutting inserts are usually used for heavy milling operations with high feed rates. The detailed description of the testing inserts is given below in Table 3.

TABLE 3

Milling Inserts used in the Comparative Test

| Carbide Cutting Inserts | Ruthenium Composition (weight per cent) | Hardness (HCA) | Wt % of Ru in the binder phase |
|---|---|---|---|
| X44 with AlCrN PVD | 1.8 | 91.4 | 13% |
| X44 with AlTiN PVD | 1.8 | 91.4 | 13% |
| T14A with AlCrN PVD | 0 | 91.3 | 0 |
| T14A with AlTiN PVD | 0 | 91.3 | 0 |
| X500 with TiN-TiC-TiN CVD Coating | 1.4 | 89.5 | 14.7% |

In Table 3, T14A is also a commercial designation of Stellram's cutting tool products. T14A is a carbide substrate without ruthenium included in the binder. The hardness of T14A substrate is very close to that of X44 substrate. The cutting conditions used in the test are shown as follows.

| | |
|---|---|
| Cutting speed: | Vc = 147 m/min |
| Feed rate: | Fz = 1 mm/Z |
| Depth of cut: | DCC = 2 mm |
| Work Material: | 4340 steel with a hardness of 375 HB |

Figure 2:
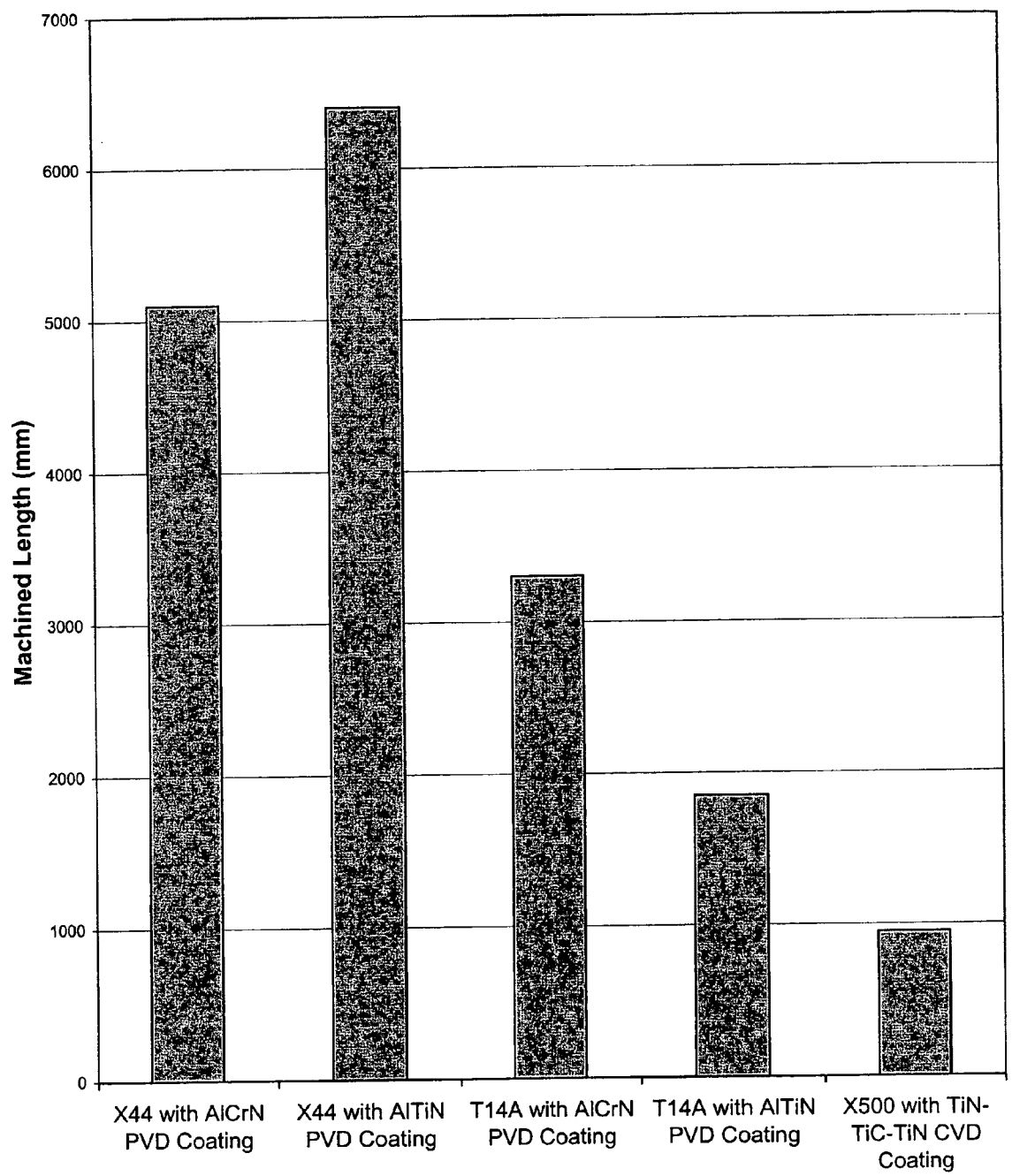
FIG. 2 is a graph of the test results of comparative testing performed on embodiments of cutting inserts of the present invention and cutting inserts of the prior art.

The comparative test results are shown in FIG. 2. During the test, tool wear for each cutting insert was measured at a prescribed time interval until the wear reached a certain level indicating the tool failure. All the values in FIG. 2 were based on the average from the repeated machining tests.

It is clear from the results of this comparative test that the PVD coated Ru-featured carbide cutting inserts show the best cutting performance in terms of tool life, for example, a the PVD coated Ru-featured cutting insert 55% longer tool life than x44-AlCrN PVD coating with T14A-AlCrN PVD, and a 245% longer tool life than x44-AlTiN PVD coating with T14A-AlTiN PVD. The PVD coated Ru-featured cutting inserts provided in this invention outperform those having the same Ru-featured substrate but with CVD coatings as well as those with PVD coatings but without Ru-featured substrate.

It will be appreciated by those of ordinary skill in the art that the present invention provides certain test parameters, conditions, and characteristics relative to specific compositions and method to the characteristics of Ru-featured cutting tools. These parameters, conditions, and characteristics provide an approach to improve properties, such as the tool life, of certain cutting insert. It will also be appreciated by those skilled in the art that changes could be made to the embodiments described herein without departing from the broad concept of the invention. It is understood, therefore, that this invention is not limited to the particular embodiments disclosed, but is intended to cover modifications that are within the spirit and scope of the invention, as defined by the appended claims.

The invention claimed is:

1. A cutting tool, comprising:
   a cemented carbide substrate, wherein the substrate comprises hard particles and a binder, and the binder comprises ruthenium; and
   at least one coating on at least a portion of the substrate, wherein the coating has the characteristics of a coating applied by physical vapor deposition.

2. The cutting tool of claim 1, wherein the wear resistant coating has a thickness of from 1 to 10 microns.

3. The cutting tool of claim 1, wherein the binder comprises at least one of iron, nickel and cobalt.

4. The cutting tool of claim 3, wherein the binder comprises cobalt.

5. The cutting tool of claim 4, wherein the concentration of ruthenium in the binder is from 3% and 30%, by weight.

6. The cutting tool of claim 5, wherein the concentration of ruthenium in the binder is from 8% and 30%, by weight.

7. The cutting tool of claim 6, wherein the concentration of ruthenium in the binder is from 8% and 20%, by weight.

8. The cutting tool of claim 7, wherein the concentration of ruthenium in the binder is from 10% and 15%, by weight.

9. The cutting tool of claim 1, wherein the at least one coating comprises at least one of a metal carbide, a metal nitride, a metal silicon and a metal oxide of a metal selected from groups IIIA, IVB, VB, and VIB of the periodic table.

10. The method of claim 9, wherein the coating comprises at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide (Al2O3), titanium diboride (TiB2), tungsten carbide carbon (WC/C), chromium nitride (CrN) and aluminum chromium nitride (AlCrN).

11. The cutting tool of claim 10, wherein the at least one coating has a thickness from 2 to 6 micrometers.

12. The cutting tool of claim 10, wherein the at least one coating comprises multiple layers.

13. The cutting tool of claim 1, wherein the hard particles are at least one of metal carbides, nitrides, borides, silicides, oxides and solid solutions thereof.

14. The cutting tool of claim 13, wherein the metal of the metal carbides, nitrides, borides, silicides, oxides, and solid solutions thereof is at least one of titanium, chromium, vanadium, zirconium, hafnium, tantabium, molybdenum, niobium and tungsten.

15. A method of coating a substrate, comprising: applying a coating on a cemented carbide substrate by physical vapor deposition, wherein the substrate comprises a hard particles and a binder and the binder comprises ruthenium.

16. The method of claim 15, wherein the wear resistant coating has a thickness from 2 to 6 microns.

17. The method of claim 15, wherein the binder is at least one of iron, nickel and cobalt.

* * * * *

UNITED STATES PATENT AND TRADEMARK OFFICE
CERTIFICATE OF CORRECTION

PATENT NO. : 7,244,519 B2  Page 1 of 8
APPLICATION NO. : 10/922750
DATED : July 17, 2007
INVENTOR(S) : Festeau et al.

It is certified that error appears in the above-identified patent and that said Letters Patent is hereby corrected as shown below:

Please delete the Title page and Column 1 line 1 thru Column 12 line 23 and insert the Title page and Column 1 line 1 thru Column 12 line 36 as attached.

Signed and Sealed this

Twenty-seventh Day of July, 2010

David J. Kappos
*Director of the United States Patent and Trademark Office*

(12) United States Patent
Festeau et al.

(10) Patent No.: US 7,244,519 B2
(45) Date of Patent: Jul. 17, 2007

(54) PVD COATED RUTHENIUM FEATURED CUTTING TOOLS

(75) Inventors: Gilles Festeau, Ferney Voltaire (FR); X. Daniel Fang, Franklin, TN (US); David J. Wills, Brentwood, TN (US)

(73) Assignee: TDy Industries, Inc., Pittsburgh, PA (US)

( * ) Notice: Subject to any disclaimer, the term of this patent is extended or adjusted under 35 U.S.C. 154(b) by 203 days.

(21) Appl. No.: 10/922,750

(22) Filed: Aug. 20, 2004

(65) Prior Publication Data
US 2006/0051618 A1 Mar. 9, 2006

(51) Int. Cl.
B32B 9/06 (2006.01)
(52) U.S. Cl. ............... 428/698; 51/207; 51/309; 75/241; 428/469; 428/472; 428/699; 204/197.11
(58) Field of Classification Search .............. 51/307, 51/309; 75/241; 428/469, 472, 698, 699; 204/192.11
See application file for complete search history.

(56) References Cited
U.S. PATENT DOCUMENTS
4,574,011 A * 3/1986 Bonjour et al. ............. 75/241

FOREIGN PATENT DOCUMENTS
| GB | 622041 | * | 4/1949 |
| GB | 1082568 | * | 9/1967 |
| GB | 1309634 | * | 3/1973 |
| JP | 2003-306739 | * | 10/2003 |
| JP | 2004-181604 | * | 7/2004 |
| WO | 99/13121 | * | 3/1999 |
| WO | 00/52217 | * | 9/2000 |

OTHER PUBLICATIONS

Tracey et al "Development of Tungsten Carbide-Cobalt-Ruthenium Cutting Tools for Machining Steels" Proceedings Annual Microprogrammin Workshop vol. 14, 1981, p. 281-292.*

* cited by examiner

Primary Examiner—Archene Turner
(74) Attorney, Agent, or Firm—Kirkpatrick + Lockhart Preston Gates Ellis LLP; Mark R. Leslie; Patrick J. Viccaro

(57) ABSTRACT

The present invention relates to the PVD coated tungsten carbide (WC) based cemented cutting inserts with ruthenium (Ru) as a key chemical element, or a key feature, in the cobalt (Co)-based binder phase, particularly useful for machining today's mold & die materials. In the Ru—Co mixed binder phase in the tungsten carbide substrate, the ratio of Ru/Co is at least 3%, by weight. The Ru-featured carbide cutting insert provided in this invention is PVD coated with one or more layers by a modern PVD coating technology. The development of the PVD coated Ru-featured carbide cutting inserts provided in this invention is based on a discovery that the unique combination of PVD coating techniques and Ru-featured carbide cutting inserts demonstrates superior machining performance in today's mold & die machining applications.

31 Claims, 2 Drawing Sheets

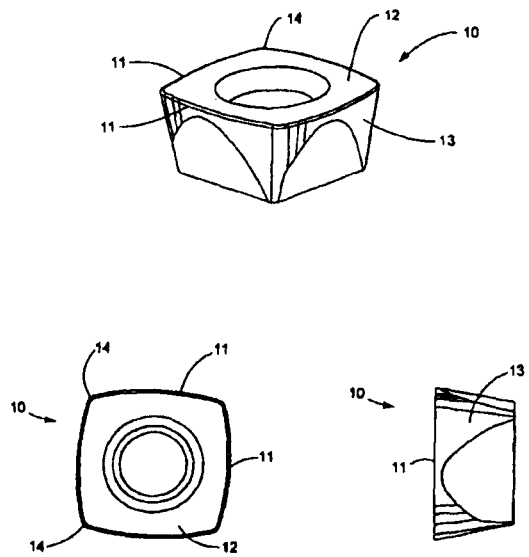

PVD COATED RUTHENIUM FEATURED CUTTING TOOLS

TECHNICAL FIELD

The present invention relates to cemented carbide based cutting tools and inserts coated by a physical vapor deposition process. More specifically, the present invention relates to such cutting tools and inserts comprising ruthenium (Ru) as a component in the binder of the cemented carbide and methods of producing such cutting tools.

BACKGROUND

Cemented carbide cutting tools and inserts (generally "cutting tools") are commonly employed in machining operations such as, for example, cutting, drilling, reaming, countersinking, counterboring, end milling, turning, grooving, threading, and tapping. The manufacturing process for cemented carbide cutting tools involves consolidating metallurgical powder (comprised of hard particles and a binder) to form a compact. The compact is then sintered to form a cylindrical tool blank having a solid monolithic construction. Subsequent to sintering, the tool blank may be appropriately machined to form a cutting edge or other features of the particular geometry desired on the cutting tool.

Cemented carbide tools are industrially important because of the combination of tensile strength, wear resistance, and toughness that is characteristic of these materials. The hard particles may be, for example, carbides, nitrides, borides, silicides, or oxides of elements within groups IVB through VIB of the periodic table. A common example is tungsten carbide. The binder may be a metal or metal alloy, typically cobalt, nickel, iron or alloys of these metals. The binder "cements" the hard particles within a continuous matrix interconnected in three dimensions.

The physical and chemical properties of cemented carbide materials depend in part on the individual components of the metallurgical powders used to produce the material. The properties of the cemented carbide materials are determined by, for example, the chemical composition of the hard particle, the average particle size and particle size distribution of the hard particles, the chemical composition of the binder, and the ratio of binder to hard particle in the substrate. By varying the components of the metallurgical powder, cutting tools, including cutting inserts, may be produced with unique properties matched to specific applications. Many cemented carbide cutting tools are prepared with in cobalt as the primary component of the binder, such cemented carbides may be particularly useful for machining today's mold and die materials. The weight percentage of cobalt as a binder in such cemented carbide cutting tools, typically, ranges from 5 to 20%.

Presently, a very limited amount of cemented carbide cutting tools have been prepared with ruthenium added to a cobalt binder. According to the reference book Modern Metal Cutting by Sandvik (ISBN-9197229930, 1996), typical substrates of cutting inserts are tungsten-based carbide (WC), cubic boron nitride (CBN), ceramic (Al2O3/Si3N4), titanium-based carbide or cermet (TiC/TiN), coronite (combined high speed steel and carbide) and polycrystalline diamond (PCD). According to the reference book World Directory and Handbook of Hardmetals and Hard Materials, 5$^{th}$ Edition (ISBN-0950899526), 1992, by K. J. Brookes, which collects carbide data from all major carbide cutting tool manufacturers worldwide, almost all tungsten carbides use cobalt as a binder with addition of a balance of some other alloying compounds, such as TiC, TaC/NbC, to refine the properties of the substrate for particular applications.

Ruthenium (Ru) is a member of the platinum group and is a hard, lustrous, white metal that has a melting point of approximately 2,500° C. Ru does not tarnish at room temperatures, and may be used as an effective hardener, creating alloys that are extremely wear resistant. Stellram, an Allegheny Technologies Company located at 1 Teledyne Place, LaVergne, Tenn., USA 37086, has found that adding an amount of Ru into the cobalt binder continuous phase of a tungsten carbide substrate results in a cemented carbide cutting insert with improved resistance to thermal cracking and significant reduction of the propagation of cracks along and beyond the cutting insert edges and propagation of cracks into the substrate during use in machining processes. Such substrates may be called Ru-featured cemented carbides. The amount of Ru may be varied depending on the application, however, typical commercially available products include a concentration of ruthenium in the binder phase of cemented carbide substrates in the ranges of approximately 5% to 25%, by weight.

The cemented carbide substrates may additionally include a single or multiple layer coating to enhance cutting performance of tungsten carbide cutting inserts. Methods for coating cemented carbide cutting tools include chemical vapor deposition (CVD), physical vapor deposition (PVD) and diamond coating. Most often, CVD is used to apply the coating to cutting inserts due to the well-known advantages of CVD coatings in cutting tools. It is well known that PVD coatings are thinner than CVD coatings, thus provide the advantage of retaining sharp cutting edges.

As an example of PVD coating technologies, U.S. Pat. No. 6,352,627 B2 discloses a PVD coating method and device, which is based on magnetron sputtering techniques to produce refractory thin films or coats on cutting inserts, can deliver three consecutive voltage supplies during the coating operation, promoting an optimally enhanced ionization process that results in good coating adhesion on the substrate, even if the substrate surface provided is rough, for example because of grinding or jet abrasion treatment. Examples of some other PVD coating technologies are ion plating, arc discharge evaporation, ion beam assisted deposition and activated reactive evaporation.

Diamond compacts, or composite diamond compacts, may contain Ru as a significant element in the substrate material (no more than 20% by volume), such as in U.S. Pat. No. 6,620,375 B1, European Patent 1,077,783. Diamond compacts may also be called polycrystalline diamond (PCD) and may be manufactured under elevated temperature and pressure conditions. Diamond compacts are brittle in nature and thus they have to be bonded to a substrate that contains a binder, such as cobalt, iron or nickel, that may further include Ru. A diamond compact contains a polycrystalline mass of diamond particles presented in an amount of at least 80% by volume of the substrate. Diamond compacts are typically used in abrading or abrasive tools for sawing, milling or profile cutting of wood products.

Ru-featured cemented carbide cutting inserts are limited to either uncoated or CVD coated, that is to say, no PVD coatings have not been applied to Ru-featured carbide cutting inserts. For example, X500™, a commercial designation of Stellram's cutting tool products, is a multiple layer TiN—TiC—TiN CVD coated carbide cutting insert having Ru-featured substrate for the applications in machining of titanium alloys, nickel based alloys and ductile iron; and X44™ and X22™ (both commercial designations of Stellram's cutting tool products) are uncoated Ru-featured cemented carbide cutting inserts for applications in machining of steels and alloyed steels.

Different from conventional cobalt-based binder phase, in a Ru-featured cemented carbide substrate, cobalt (Co) and ruthenium (Ru) act as a mixed solvent during the sintering process. It is known that a cemented carbide cutting inserts with cobalt as a binder have a tendency for cobalt to penetrate through the surface of the compact and melt during the sintering process forming cobalt structures on the surface. This process is often referred to as cobalt capping. Cobalt caps on the substrate surface are randomly distributed, thus creating a crested and rough texture on the surface of the coating tool. The presence of Ru in the cobalt binder exaggerates the cobalt capping on cemented carbides, increasing the height and frequency of the cobalt caps. Even though some surface treatment techniques may be performed to reduce the cobalt capping effect to some degree, it is difficult to consistently produce a uniform surface on a sintered cemented carbide cutting inserts containing Ru in the binder. However, commercially available coated tools have compensated for the enhanced cobalt capping effects on the surface of the carbide cutting inserts including Ru-featured binders by applying a thick CVD coating with or without some pre-surface treatment methods like electropolishing, micro-blasting, wet blasting, compressed air blasting, etc. Thick CVD coating layers may cover up and reduce the overall impact of the cobalt capping. Additionally, the elevated CVD coating temperature (usually above 1500° C.) slightly melts the surface region of the cemented carbide and promotes better adhesion of the CVD coating layer to the surface. Thus, as of today, the Ru-featured carbide cutting inserts are limited only to uncoated and CVD coated inserts.

A PVD coating process involves a much lower coating temperature and, therefore, does not remelt the surface binder and tends to produce coatings that are not as well adhered to the carbide substrate surface. Additionally, thin PVD coatings cannot compensate for the enhanced cobalt capping effect. This is believed to be the reason that Ru-featured carbide cutting inserts are limited to uncoated or CVD coated cutting tools. The apparent difficulties of applying the low operation temperature based thin PVD coatings to guarantee consistent surface quality of coated carbide cutting inserts has not been considered feasible.

SUMMARY

The present invention relates to coated cutting tools comprising a substrate, wherein the substrate comprises hard particles and a binder, and the binder comprises ruthenium. The cutting tools may have at least one coating on at least a portion of the substrate, wherein the coating has the characteristics of a coating applied by physical vapor deposition. The binder may comprise at least one of iron, nickel, cobalt and alloys of such elements. The ruthenium concentration in the binder may be any concentration capable of providing the substrate with the desired properties. In certain embodiments, the concentration of ruthenium in the binder may be from 3% to 30%, by weight.

The cutting tool of the present invention comprises at least one coating having the characteristics of a coating applied by PVD of a metal carbide, a metal nitride, a metal boride and a metal oxide of a metal selected from groups IIIA, IVB, VB, and VIB of the periodic table, such as but not limited to, at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (Al-TiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN).

The present invention also relates to methods of coating a substrate, comprising applying a coating on a substrate by physical vapor deposition, wherein the substrate comprises hard particles and a binder and the binder comprises ruthenium. The method may also include treating the substrate prior to coating the substrate, such as by electropolishing, microblasting, wet blasting, grinding, brushing, jet abrading and compressed air blasting. Additional coatings on the substrate may be applied by either by physical vapor deposition or chemical vapor deposition.

The reader will appreciate the foregoing details, as well as others, upon considering the following detailed description of certain non-limiting embodiments. The reader also may comprehend additional details of the present disclosure upon making and/or using the PVD coated cutting tools of the present disclosure.

BRIEF DESCRIPTION OF THE FIGURES

FIGS. 1A, 1B and 1C show an embodiment of a typical cutting insert, wherein FIG. 1A is a perspective view of the cutting insert, FIG. 1B is a top view of the cutting insert, and FIG. 1C is a side view of the cutting insert; and FIG. 2 is a graph of the test results of comparative testing performed on embodiments of cutting inserts of the present invention and cutting inserts of the prior art.

DESCRIPTION OF EMBODIMENTS OF THE INVENTION

The present invention in directed to a cutting tool comprising a substrate, wherein the substrate comprises hard particles and a binder, and the binder comprises ruthenium. The substrate additionally comprises at least one coating on at least a portion of the substrate, wherein the coating has the characteristics of a coating applied by physical vapor deposition.

Embodiments include cutting tools in which the substrate may be any combination of hard particles and a binder, such as a cemented carbide. The binders of cemented carbides are typically at least one of iron, nickel, cobalt, and alloys of these metals. In embodiments of the present invention the binder additionally includes ruthenium. Ruthenium may be present in any quantity effective to have a beneficial effect on the properties of the cutting tool, such as a concentration of ruthenium in the binder from 3% and 30%, by weight. In certain embodiments, the concentration of ruthenium in the binder may be from 8% and 30%, by weight, from 8% and 20%, or even from 10% and 15%, by weight.

The binder also may contain, for example, elements such as W, Cr, Ti, Ta, V, Mo, Nb, Zr, Hf, and C up to the solubility limits of these elements in the binder. Additionally, the binder may contain up to 5 weight percent of elements such as Cu, Mn, Ag and Al. One skilled in the art will recognize that any or all of the constituents of the cemented carbide material may be introduced in elemental form, as compounds, and/or as master alloys.

The hard particles of substrates of the present invention may be at least one of metal carbides, nitrides, borides, suicides, oxides, and solid solutions thereof. More specifically, the hard particles may comprise at least one transition metal carbide, nitride, boride, silicide and oxide selected from such compounds titanium, chromium, vanadium, zirconium, hafnium, tantalum, molybdenum, niobium, and tungsten or solid solutions thereof. As used herein, a cemented carbide includes substrates containing such hard particles in a binder. In a preferred cutting tool embodiment, the substrate comprises tungsten carbide in a binder of cobalt and ruthenium.

The coating applied by physical vapor deposition may be any coating capable of being applied by any physical deposition method. Typical, PVD processes include, but are not limited to, evaporation processes, activated reactive evaporation, arc discharge evaporation, laser ablation, ion plating, and sputtering, ion plating, and ion beam assisted deposition. The PVD coatings generated on Ru-featured cemented carbide cutting inserts can be characterized as thin, hard, homogeneously smooth, chemically stable and having a highly dense structure. PVD coatings may be further characterized by some unique differences in the microstructure and residual stresses of coatings deposited by PVD and CVD. PVD coating will have high residual compression stress and fine grains usually improve the hardness and toughness of PVD coatings. Embodiments of the coating applied by PVD may be at least one coating comprising at least one of a metal carbide, a metal nitride, a metal boride, and a metal oxide of a metal selected from groups IIIA, IVB, VB, and VIB of the periodic table. For example, coating on the cutting tools of the present invention may be at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN). In certain embodiments, the coating may be from 1 to 10 micrometers thick. Though it may be preferable in specific applications for the PVD applied coating to be from 2 to 6 micrometers thick.

The present invention also includes a method of coating a substrate. Embodiments of the method of the present invention include applying a coating on a cemented carbide substrate by PVD, wherein the cemented carbide substrate comprises hard particles and a binder and the binder comprises ruthenium. The PVD coated Ru-featured carbide cutting inserts provided in this invention may use any PVD coating technology. Such PVD coating applied to the substance comprising a binder including ruthenium produce coatings with enhanced hardness, reduced friction, chemical stability, wear resistance, thermal crack resistance and prolonged tool life. In embodiments, the coating may be applied to a thickness of from 1 to 10 micrometers (microns) or in certain embodiments a thickness of 2 to 6 micrometers may be desirable.

The method may include treating the substrate prior to coating the substrate. The treating prior to coating comprises at least one of electropolishing, shot peening, microblasting, wet blasting, grinding, brushing, jet abrading and compressed air blasting. Pre-coating surface treatments on any coated (CVD or PVD) carbide cutting inserts may reduce the cobalt capping effect of substrates. Examples of pre-coating surface treatments include wet blasting (U.S. Pat. Nos. 5,635,247 and 5,863,640), grinding (U.S. Pat. No. 6,217,992 B1), eletropolishing (U.S. Pat. No. 5,665,431), brushing (U.S. Pat. No. 5,863,640), etc. Improper pre-coating surface treatment may lead to poor adhesion of PVD coats on the Ru-featured carbide substrate, thus resulting in premature failure of PVD coatings. This is primarily due to the fact that the PVD coating layers are thin and the surface irregularities due to cobalt capping are more pronounced in a Ru-featured carbide substrate.

In certain embodiments, the method may comprise applying a second coating comprising of at least one of a metal carbide, a metal nitride, a metal boride and a metal oxide of a metal selected from groups IIIA, IVB, VB, and VIB of the periodic table. Embodiments may comprise applying at least one coating selected from titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN). The method may include applying the second and any additional coatings on the substrate by physical vapor deposition or chemical vapor deposition.

Surprisingly, a thin PVD coated Ru-featured carbide cutting tool demonstrated superior machining performance and exhibits satisfactory and consistent quality when compared to uncoated and CVD coated Ru-featured cutting tools. A PVD coating method typically may comprise all or some of the following units and steps:

- a cleaning station for cleaning and drying process steps;
- a pre-coating surface treating of the substrates, such as, but not limited to electropolishing, shot peening, microblasting, wet blasting, grinding, brushing, jet abrading and compressed air blasting, dust extraction and vacuum cleaning;
- a quality management computer system for effective in-process quality control and documentation;
- a batching station for handling the sequence and method for automatic loading parts; and
- an optional post-coating surface treating, such as, but not limited to, blasting, shot peening, compressed air blasting, and brushing, to further improve the surface finish of the coated parts.

Certain embodiments of the cutting tools of the present invention may incorporate a step of treating the coating on the substrate to further improve the surface quality on the coated cutting inserts. Treating of the PVD coating of the cutting inserts of the present invention can further improve the surface quality of the coated layer. There are a number of methods for post treatment of a coated cutting insert surface, for example, shot peening, Japanese Patent 02254144, that describes a process using injection of small metal particles having a spherical grain shape with grain size in a range of 10-2000 mm. Another example of post-coating surface treatment is compressed-air blasting, European Patent 1,198,609 B1, that describes a process using an inorganic blasting agent, like $Al_2O_3$, with a very fine grain size ranging from 1 to 100 mm. Another example of post coating treatment is brushing, U.S. Pat. No. 6,638,609 B2, that describes a process using a nylon straw brush containing SiC grains. A gentle wet blasting may also be used as a post-coating surface treatment to create a smooth coating layer such as described in, U.S. Pat. No. 6,638,609 B2. In general, a fine surface treatment technique on PVD coated inserts can create smoothed and homogenized surface structure of PVD coatings on carbide cutting inserts.

The following examples of PVD coated cemented carbide tools and comparative machining test examples were conducted at different cutting conditions in order to evaluate advantages of cutting tools and methods according to the present disclosure.

EXAMPLES

Example 1

Uncoated Sample Tungsten Carbide Insert with 13 wt % Ruthenium in the Binder (X22 Substrate)

According to ISO standard on the substrate grade of cutting tool materials, X22 is close to a tough grade K30. Shown in Table 1 were the chemical compositions of the X22 metal powers. The major compositions in such powder materials include WC, Co and Ru. Some mechanical properties for the sintered tungsten carbides are also listed in Table 1.

TABLE 1

| Chemical Composition of the Substrate (wt. %) | | | Average Grain Size | Transverse Rupture Strength | Density | Hardness |
|---|---|---|---|---|---|---|
| WC | Co | Ru | (µm) | (N/µm$^2$) | (g/cm$^3$) | (HRA) |
| 90.8 | 8.0 | 1.20 | <1 | 3500 | 14.55 | 92.0 |

The metal powders in the weight percentages shown in Table 1 were mixed and then wet blended by a ball mill over a 72-hour period. After drying, the blended compositions were compressed into green sized bodies of the designed cutting insert under a pressure of 1-2 tons/cm$^2$. Then the compacted green bodies of the tungsten carbide cutting inserts were sintered, or heat-treated, in a furnace to close the pores in the green bodies and build up the bond between the hard particles to increase the strength and hardness. In particular, to effectively reduce the micro-porosity of the sintered substrate and ensure the consistent sintering quality of the X22™ Ru-featured carbide cutting inserts, the sinter-HIP, i.e. high-pressure sintering process, was used to introduce a pressure phase following the dewaxing, presintering and low-pressure nitrogen (N$_2$) sintering cycle. The sintering procedure X22™ Ru-featured carbide cutting inserts was performed using the following parameters during the major processing steps:

the dewaxing cycle started at room temperature with a ramping speed of 2° C./min until reaching a temperature of 400° C. and then held at this temperature for approximately 90 minutes;

the presintering cycle, which breaks down the oxides of Co, WC, Ti, Ta, Nb, etc., started with a ramping speed of 4° C./min until reaching a temperature of 1,200° C. and then held this temperature for an additional 60 minutes;

the low pressure nitrogen (N$_2$) gas was introduced at 1,350° C. during the temperature ramping from 1,200° C. to 1,400° C./1,450° C., i.e. sintering temperature, and then held at this sintering temperature 1,400° C./1,450° C. at a pressure of about 2 torrs for approximate 30 minutes;

the sinter-HIP process was then initiated while at the sintering temperature, i.e. 1,400° C./1450° C., during the process that argon (Ar) pressure was introduced and rose to 760 psi in 30 minutes, and then the pressure of the sinter-HIP process was held at this pressure for additional 30 minutes; and finally the cooling cycle was carried out to let the heated green bodies of the X22™ carbide cutting inserts cool down to room temperature while inside the furnace.

The X22™ Ru-featured carbide cutting inserts produced by this process shrunk into the desired sintered size and became non-porous.

Example 2

PVD Coated Sample Tungsten Carbide Insert with 13 wt % Ruthenium in the Binder (X44 Substrate)

Metal powder materials in the weight percentages shown in Table 2 were prepared. The major compositions in such powder materials include WC, TiC, TaC, NbC, Co and Ru. Some mechanical properties for the sintered tungsten carbides are also listed in Table 2.

TABLE 2

| Chemical Compositions (weight %) | | | | | | Average Grain Size | Transverse Rupture Strength | Density | Hardness |
|---|---|---|---|---|---|---|---|---|---|
| WC | TiC | TaC | NbC | Co | Ru | (µm) | (N/µm$^2$) | (g/cm$^3$) | (HRA) |
| 67.2 | 10 | 7 | 2 | 12 | 1.80 | 1-2 | 2300 | 11.70 | 91.4 |

The metal powders with compositions as defined in Table 2 were mixed and then wet blended in a ball mill over a 72-hour period. After drying, the blended compositions were compressed into green sized bodies of the designed cutting insert under a pressure of 1-2 tons/cm$^2$. Then the compacted green bodies of the tungsten carbide cutting inserts were sintered, or heat-treated, in a furnace to close the pores in the green bodies and build up the bond between the hard particles to increase the strength and hardness. In particular, to effectively reduce the micro-porosity of the sintered substrate and ensure the consistent sintering quality of X44™ Ru-featured carbide cutting inserts, the sinter-HIP, i.e. high-pressure sintering process, was used to introduce a pressure phase following the dewaxing, presintering and vacuum sintering cycle. The sintering procedure for X44™ Ru-featured carbide cutting inserts was performed using the following parameters during the major processing steps:

the dewaxing cycle started at room temperature with a ramping speed of 2° C./min until reaching a temperature of 400° C. and then this temperature was held for an additional 90 minutes;

the presintering cycle, which breaks down the oxides of Co, WC, Ti, Ta, Nb, etc., started with a ramping speed of 4° C./min until the temperature reached 1,200° C. and then this temperature was held for approximately 60 minutes;

the vacuum cycle was then begun at a temperature of 1,350° C. during the temperature ramping process of the presintering cycle from 1,200° C. to 1,400° C./1,450° C., and then held at this sintering temperature for about 30 minutes;

the sinter-HIP process was then initiated while at the sintering temperature, i.e. approximately 1,400° C./1,450° C., during the process argon (Ar) gas was introduced and raising the pressure to 760 psi in 30 minutes, and then the sinter-HIP process held at this pressure for additional 30 minutes; and the cooling cycle was conducted to let the heated green bodies of the X44™ carbide cutting inserts cool down to room temperature while inside the furnace.

Thus obtained X44™ Ru-featured carbide cutting inserts shrunk into the desired sintered size and became non-porous. Followed by the sintering process, the sintered tungsten carbide cutting inserts may be ground and edge-honed to become finished uncoated final products. Followed by the sintering process, the sintered tungsten carbide cutting inserts may be ground and edge-honed to be ready for pre-coating surface treatment and PVD coating operation.

The PVD coating process for this X44™ substrate is a single layer with coating material composition of aluminum-titanium-nitride or AlTiN. Prior to PVD coating, the surface of X44 carbide cutting inserts was blasted to provide better prepared surface. The PVD coating is around 4 microns in thickness on the surface of Ru-featured X44 carbide cutting inserts.

Example 3

Comparative Testing Results of High-Feed Milling Inserts:

A series of milling cutting inserts with the same insert shape and top geometry, described according to the ASTM Standard as XDLW120508SR-D, was selected as testing inserts to compare machining performance of different types of cutting inserts including the one with Ru-featured substrate provided in this invention. Based on ISO standard, the insert XDLW120508SR-D can be described as a special shape, as shown in FIGS. 1A, 1B and 1C, with 12 mm in diameter, 5.56 mm in thickness and single sided with a clearance angle of 15 degrees. Embodiments of the cutting inserts 10 have cutting edges 11, a top surface 12, side walls 13 and nose corners 14. Such cutting inserts are usually used for heavy milling operations with high feed rates. The detailed description of the testing inserts is given below in Table 3.

TABLE 3

Milling Inserts used in the Comparative Test

| Carbide Cutting Inserts | Ruthenium Composition (weight per cent) | Hardness (HCA) | Wt % of Ru in the binder phase |
|---|---|---|---|
| X44 with AlCrN PVD Coating | 1.8 | 91.4 | 13% |
| X44 with AlTiN PVD | 1.8 | 91.4 | 13% |
| T14A with AlCrN PVD | 0 | 91.3 | 0 |
| T14A with AlTiN PVD | 0 | 91.3 | 0 |
| X500 with TiN-TiC-TiN CVD Coating | 1.4 | 89.5 | 14.7% |

In Table 3, T14A is also a commercial designation of Stellram's cutting tool products. T14A is a carbide substrate without ruthenium included in the binder. The hardness of T14A substrate is very close to that of X44 substrate. The cutting conditions used in the test are shown as follows.

| Cutting speed: | Vc = 147 m/min |
| Feed rate: | Fz = 1 mm/Z |
| Depth of cut: | DCC = 2 mm |
| Work Material: | 4340 steel with a hardness of 375 HB |

The comparative test results are shown in FIG. 2. During the test, tool wear for each cutting insert was measured at a prescribed time interval until the wear reached a certain level indicating the tool failure. All the values in FIG. 2 were based on the average from the repeated machining tests.

It is clear from the results of this comparative test that the PVD coated Ru-featured carbide cutting inserts show the best cutting performance in terms of tool life, for example, a the PVD coated Ru-featured cutting insert 55% longer tool life than x44-AlCrN PVD coating with T14A-AlCrN PVD, and a 245% longer tool life than x44-AlTiN PVD coating with T14A-AlTiN PVD. The PVD coated Ru-featured cutting inserts provided in this invention outperform those having the same Ru-featured substrate but with CVD coatings as well as those with PVD coatings but without Ru-featured substrate.

It will be appreciated by those of ordinary skill in the art that the present invention provides certain test parameters, conditions, and characteristics relative to specific compositions and method to the characteristics of Ru-featured cutting tools. These parameters, conditions, and characteristics provide an approach to improve properties, such as the tool life, of certain cutting insert. It will also be appreciated by those skilled in the art that changes could be made to the embodiments described herein without departing from the broad concept of the invention. It is understood, therefore, that this invention is not limited to the particular embodiments disclosed, but is intended to cover modifications that are within the spirit and scope of the invention, as defined by the appended claims.

The invention claimed is:

1. A cutting tool, comprising:
 a cemented carbide substrate, wherein the substrate comprises hard particles and a binder, and the binder comprises ruthenium; and
 at least one coating on at least a portion of the substrate, wherein the coating has the characteristics of a coating applied by physical vapor deposition.

2. The cutting tool of claim 1, wherein the wear resistant coating has a thickness of from 1 to 10 microns.

3. The cutting tool of claim 1, wherein the binder comprises at least one of iron, nickel and cobalt.

4. The cutting tool of claim 3, wherein the binder comprises cobalt.

5. The cutting tool of claim 4, wherein the concentration of ruthenium in the binder is from 3% and 30%, by weight.

6. The cutting tool of claim 5, wherein the concentration of ruthenium in the binder is from 8% and 30%, by weight.

7. The cutting tool of claim 6, wherein the concentration of ruthenium in the binder is from 8% and 20%, by weight.

8. The cutting tool of claim 7, wherein the concentration of ruthenium in the binder is from 10% and 15%, by weight.

9. The cutting tool of claim 1, wherein the at least one coating comprises at least one of a metal carbide, a metal nitride, a metal silicon and a metal oxide of a metal selected from groups IIIA, IVB, VB, and VIB of the periodic table.

10. The method of claim 9, wherein the coating comprises at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide (Al2O3), titanium diboride (TiB2), tungsten carbide carbon (WC/C), chromium nitride (CrN) and aluminum chromium nitride (AlCrN).

11. The cutting tool of claim 10, wherein the at least one coating has a thickness from 2 to 6 micrometers.

12. The cutting tool of claim 10, wherein the at least one coating comprises multiple layers.

13. The cutting tool of claim 1, wherein the hard particles are at least one of metal carbides, nitrides, borides, silicides, oxides and solid solutions thereof.

14. The cutting tool of claim 13, wherein the metal of the metal carbides, nitrides, borides, silicides, oxides, and solid solutions thereof is at least one of titanium, chromium, vanadium, zirconium, hafnium, tantabium, molybdenum, niobium and tungsten.

15. A method of coating a substrate, comprising: applying a coating on a cemented carbide substrate by physical vapor deposition, wherein the substrate comprises a hard particles and a binder and the binder comprises ruthenium.

16. The method of claim 15, wherein the wear resistant coating has a thickness from 2 to 6 microns.

17. The method of claim 15, wherein the binder is at least one of iron, nickel and cobalt.

18. The method of claim 17, wherein the binder is cobalt.

19. The method of claim 17, wherein the concentration of ruthenium in the binder is from 3% to 30%, by weight.

20. The method of claim 19, wherein the concentration of ruthenium in the binder is from 8% and 30%, by weight.

21. The method of claim 20, wherein the concentration of ruthenium in the binder from 8% and 20%, by weight.

22. The method of claim 21, wherein the concentration of ruthenium in the binder from 10% and 15%, by weight.

23. The method of claim 15, further comprising: treating the substrate prior to coating the substrate.

24. The method of claim 23, wherein treating the substrate prior to coating comprises at least one of electropolishing, microblasting, wet blasting, grinding, brushing, jet abrading and compressed air blasting.

25. The method of claim 15, wherein a coating is formed on at least a portion of the substrate, further comprising: treating the coating on the substrate.

26. The method of claim 25, wherein treating the coating on the substrate comprises at least one of shot peening, compressed air blasting, and brushing.

27. The method of claim 15, further comprising applying additional coatings on the substrate by physical vapor deposition.

28. The method of claim 15, further comprising applying additional coatings on the substrate by chemical vapor deposition.

29. The method of claim 15, wherein the coating comprises at least one of a metal carbide, a metal nitride, a metal silicon and a metal oxide of a metal selected from groups IIIA, IVB, VB, and VIB of the periodic table.

30. The method of claim 29, wherein the coating comprises at least one of titanium nitride (TiN), titanium carbonitride (TiCN), titanium aluminum nitride (TiAlN), titanium aluminum nitride plus carbon (TiAlN+C), aluminum titanium nitride (AlTiN), aluminum titanium nitride plus carbon (AlTiN+C), titanium aluminum nitride plus tungsten carbide/carbon (TiAlN+WC/C), aluminum titanium nitride (AlTiN), aluminum titanium nitride plus carbon (AlTiN+C), aluminum titanium nitride plus tungsten carbide/carbon (AlTiN+WC/C), aluminum oxide ($Al_2O_3$), titanium diboride ($TiB_2$), tungsten carbide carbon (WC/C), chromium nitride (CrN) and aluminum chromium nitride (AlCrN).

31. The method of claim 15, wherein the coating has a thickness from 1 to 10 micrometers.

* * * * *

(12) INTER PARTES REEXAMINATION CERTIFICATE (1252nd)
United States Patent
Festeau et al.

(10) Number: US 7,244,519 C1
(45) Certificate Issued: Mar. 31, 2016

(54) PVD COATED RUTHENIUM FEATURED CUTTING TOOLS

(75) Inventors: Gilles Festeau, Ferney Voltaire (FR); X. Daniel Fang, Franklin, TN (US); David J. Wills, Brentwood, TN (US)

(73) Assignee: Kennametal Inc.

Reexamination Request:
No. 95/001,417, Aug. 16, 2010

Reexamination Certificate for:
Patent No.: 7,244,519
Issued: Jul. 17, 2007
Appl. No.: 10/922,750
Filed: Aug. 20, 2004

Certificate of Correction issued Jul. 27, 2010

(51) Int. Cl.
*B32B 9/06* (2006.01)
*C22C 29/00* (2006.01)
*B23B 27/14* (2006.01)
*C23C 30/00* (2006.01)
*C22C 29/06* (2006.01)
*B22F 5/00* (2006.01)

(52) U.S. Cl.
CPC ............ *C22C 29/005* (2013.01); *B23B 27/148* (2013.01); *C22C 29/067* (2013.01); *C23C 30/005* (2013.01); *B22F 2005/001* (2013.01)

(58) Field of Classification Search
None
See application file for complete search history.

(56) References Cited

To view the complete listing of prior art documents cited during the proceeding for Reexamination Control Number 95/001,417, please refer to the USPTO's public Patent Application Information Retrieval (PAIR) system under the Display References tab.

*Primary Examiner* — Alan Diamond

(57) ABSTRACT

The present invention relates to the PVD coated tungsten carbide (WC) based cemented cutting inserts with ruthenium (Ru) as a key chemical element, or a key feature, in the cobalt (Co)-based binder phase, particularly useful for machining today's mold & die materials. In the Ru—Co mixed binder phase in the tungsten carbide substrate, the ratio of Ru/Co is at least 3%, by weight. The Ru-featured carbide cutting insert provided in this invention is PVD coated with one or more layers by a modern PVD coating technology. The development of the PVD coated Ru-featured carbide cutting inserts provided in this invention is based on a discovery that the unique combination of PVD coating techniques and Ru-featured carbide cutting inserts demonstrates superior machining performance in today's mold & die machining applications.

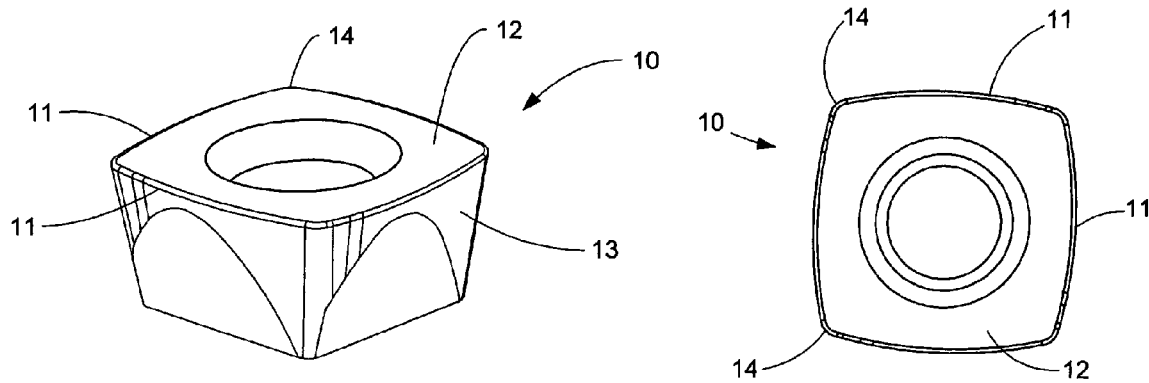

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-31 are cancelled.

* * * * *